M. PETERS
PROCESS AND APPARATUS FOR THE MANUFACTURE OF METAL TUBES AND OTHER TUBULAR ARTICLES
April 12, 1932.
Filed Dec. 13, 1924
Original Filed Dec. 13, 1924
Re. 18,418
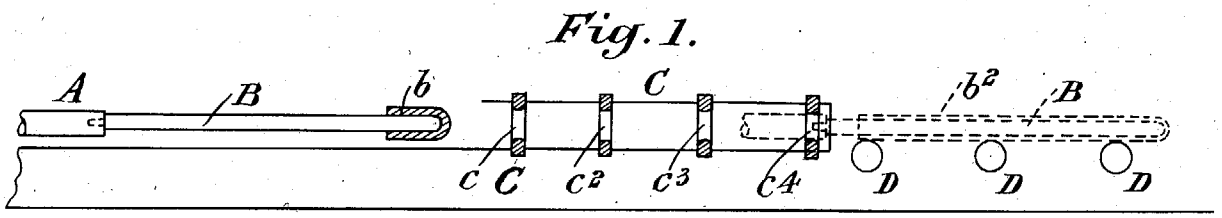
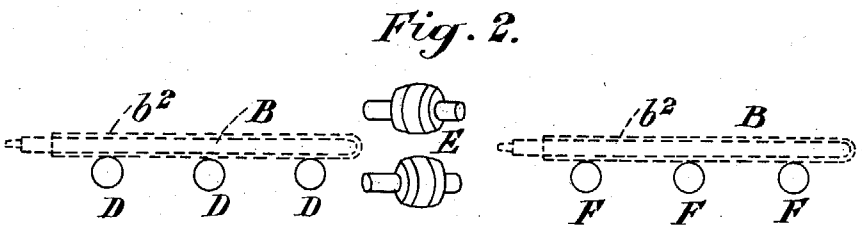
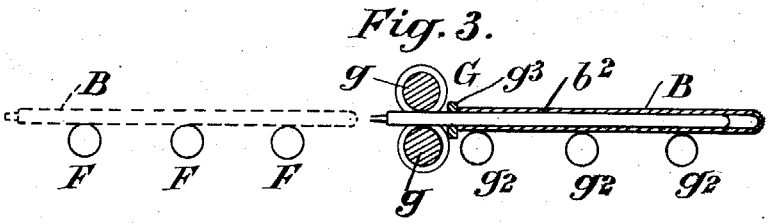
INVENTOR:-
MATHIAS PETERS
by his Attorneys
Howson and Howson Reissued Apr. 12, 1932 Re. 18,418

UNITED STATES PATENT OFFICE

MATHIAS PETERS, OF DUISBURG, GERMANY, ASSIGNOR TO WELLMAN SEAVER ROLLING MILL COMPANY, LTD., OF LONDON, ENGLAND

PROCESS AND APPARATUS FOR THE MANUFACTURE OF METAL TUBES AND OTHER TUBULAR ARTICLES

Original No. 1,720,345, dated July 9, 1929, Serial No. 755,704, filed December 13, 1924, and in Great Britain January 26, 1924. Application for reissue filed October 19, 1931. Serial No. 569,814.

This invention has for its object to effect, on apparatus of the push-bench type, the manufacture of metal tubes, or other tubular articles, in a more efficient, expeditious and economical manner than hitherto and of sound quality and also, when so desired, thinner than has hitherto been practicable on apparatus of the said type as hitherto arranged.

The tubes, or other tubular articles, which are to be made in accordance with this invention (and which for brevity I will refer to as tubes) are made from round, square, or other suitably shaped blooms, billets, or the like, (which I will refer to as billets) by forming the said billet, when in a sufficiently heated condition, in the die of a hydraulic press, for example, into a somewhat thick cup-shaped, or hollow form, the billet so shaped being then placed upon the forward end of a mandrel which is pushed forward through orifices, or through passes between rolls, which orifices, or passes, decrease successively in cross-sectional area in a forward direction, so that the said billet is reduced in thickness and spread out lengthwise along the mandrel until the said billet has been brought to, or approximately to, the form of a tube of the required thinness and length and this tube, whilst still upon the mandrel, is passed between planishing, or polishing, and reeling, rolls which planish, or polish, and equalize the thickness of, the tube and somewhat further spread the metal of the said tube sufficiently to loosen its hold upon the mandrel. Then the mandrel, still with the tube upon it, is brought into line with means by which the mandrel is withdrawn from the tube, which withdrawal can be effected, for example, by any known, or suitable, device which will draw the said mandrel from the tube through an orifice, or passage, in a plate, or abutment, brought into position for the purpose the tube being prevented from following the mandrel, by the end of the said tube bearing against the said plate, or abutment. Afterwards, if so desired, the tube can be passed between pairs of truing, or finishing, rolls.

When tubes open at both ends are required the closed end will, of course, be removed in any suitable way, the said end being however retained if, for any purpose, a tube closed at one end be required.

If desired, the tubes, or tubular articles, can be reheated and further treated as may be necessary to further adapt them for any particular purpose for which they are to be used.

In order that the manner in which this invention may be performed may be well understood I will describe, with reference to the accompanying drawing, an arrangement for making metal tubes and comprising means in accordance with this invention, the said drawings representing, diagrammatically all that is necessary to make clear, with the aid of the following description, the general arrangement of a push-bench type of apparatus to which this invention has been applied. Only such of the constituents of the apparatus are shewn as are requisite to illustrate this invention.

Fig. 1 is a diagrammatic sectional view showing the tube drawing dies and the pusher for forcing the mandrel and tube through the dies; Fig. 2 is a diagrammatic view showing the planishing rolls in side elevation; Fig. 3 is a diagrammatic sectional view showing the device for removing the tube from the mandrel.

Figures 1, 2 and 3 it will be understood succeed each other in the order of the successive operations effected by the constituents indicated. The apparatus as a whole comprises the following constituents.

Any ordinary, or suitable, means, such as a hydraulic press, for forming the billet into the required cup-shape, or hollow piece, of sufficient thickness and any necessary means for conveying the shaped, or hollow, billet, from the hydraulic press to the pusher (whose forward end is indicated at A) where the said billet is placed on the forward end of the mandrel B as shewn at *b* (see Figure 1).

The said pusher A then pushing the mandrel B, with the shaped billet thereon, through any required number of orifices (indicated at $c$, $c^2$, $c^3$, $c^4$) of diminishing diameter in a succession of die-plates C whereby the said billet is reduced in thickness and spread out lengthwise along the mandrel as indicated at $b^2$.

Rollers D which receive, and feed forward, the mandrel and the tube upon it (see Figures 1 and 2).

Planishing, or polishing, and reeling, rolls E (see Figure 2).

Rollers F (see Figures 2 and 3) from which the mandrel 1 with the tube still upon it, are fed forward to:—

Means G by which the mandrel is withdrawn from the tube the said means comprising gripping rolls $g$, and rollers $g^2$ for supporting the tube as the mandrel is withdrawn whilst the tube is prevented from following it by a die-plate which is, at the proper time, brought into position to act as an abutment for the end of the tube whilst allowing of the passage of the mandrel, the said die-plate being preferably made of hard steel, so that it will constitute a means of truing the mandrel and bringing it to proper size for re-use.

The remaining constituents of the plant, which it is unnecessary to illustrate, as they may be of any suitable kind, are:—

Means for conveying the mandrel back to receive another shaped billet and, if desired, a truing, or finishing device through which the tube is subsequently passed and means for conveying the tube to any required place.

In making tubes by means of the described apparatus, the heated billet is brought in the hydraulic press, to the requisite shape, having a hole in it to fit the forward end of the mandrel B, which is inserted in the said hole, the rear end of the mandrel B being removably connected to the pusher the end of which is indicated at A in Figure 1.

The pusher moves the mandrel forward and forces the shaped billet $b$ through the orifices $c$, $c^2$, $c^3$, $c^4$ in the series of die-plates C and, as these orifices decrease successively in cross-sectional area in a forward direction, the said shaped billet $b$, is reduced in thickness and spread out lengthwise upon the mandrel B and the said billet is brought to, or approximately to, the size of the required tube. The motion of the pusher is then reversed, leaving the mandrel which, with the tube $b^2$ still thereon, is carried forward upon the rollers D to the planishing, or polishing and reeling rolls E (see Figure 2) between which the mandrel and tube pass, the said rolls operating to planish, or polish, the tube and reel it and equalize its thickness whilst spreading the metal thereof sufficiently to loosen the hold of the said tube upon the mandrel.

The operation of the rolls E is to loosen the tube on the mandrel leaving, however, the average thickness of the tube wall and the length of the tube blank substantially unchanged. Moreover, as is shown by tests the structure of the tube remains substantially unchanged despite the reeling or planishing operation, the tubes continuing to possess the desirable structure imparted by the push bench process of manufacture.

The said rolls E, deliver the mandrel, with the now loosened tube $b^2$ thereon, onto rollers F and thence the mandrel and tube proceed to the mandrel-withdrawing means G where the mandrel with the tube upon it is pushed between the gripping rolls $g$, until the rear end of the tube $b^2$ has passed them and then the end of the mandrel is gripped by the rolls $g$ and, the abutment plate $g^3$ having been put into position, the rolls G draw the mandrel back, the end of the said tube coming against the plate $g^3$ and so being prevented from following the mandrel which is conveyed back to the position to receive another shaped billet $b$.

After the mandrel has been withdrawn from the tube the said tube can be forwarded to truing and finishing rolls if it be required to further act upon it. The said rolls, if used, are preferably set at right angles to each other.

In the following claims, the expression "billet" includes any piece of metal suited to the purposes of this invention and the expression "tube" includes any tubular article which can be formed by the process and apparatus claimed.

Having now particularly described and ascertained the nature of my said invention and in what manner the same is to be performed, I declare that what I claim is:—

1. As a step in the process of making metal tubes upon apparatus of the push-bench type; after the mandrel and the tube formed upon it have passed through the reducing means, of conveying the mandrel with the said tube upon it, through rolls which polish, or planish, it and loosen its hold upon the mandrel, and, subsequently, causing the open end of said tube to engage an abutment to thereby permit removing the mandrel from the said tube.

2. A process of making metal tubes, the said process consisting in first bringing a billet to a hollow form closed at one end and then forcing it, whilst upon the forward end of a mandrel, through reducing means, until a tube is formed upon the mandrel from the said billet, then separating the mandrel from the device by which it was forced forward, conveying the said tube, whilst still upon the mandrel, forward and through rolls which planish, or polish, and reel the said tube and loose its hold on the mandrel and afterwards maintaining said tube stationary while the mandrel is withdrawn through rolls to straighten the same for further use all substantially as hereinbefore explained.

3. As a step in the process of making metal tubes or other tubular articles upon apparatus of the push bench type in which cup-shaped billets are placed upon the forward end of a mandrel and are pushed through a series of orifices, so reducing the said billet in thickness and spreading it out longitudinally along the mandrel, conveying the mandrel with the billet or tube on it through rolls which polish or planish it and loosen its hold upon the mandrel, and subsequently withdrawing the mandrel from the said tube by means of rolls.

4. An apparatus for forming hollow tubing from cup-shaped billets comprising a mandrel adapted to support upon its end a hollow closed end billet, a plurality of reducing dies, means for forcing said mandrel with the billet thereon through said dies to produce a tube, means for withdrawing said last mentioned means, a plurality of reeling rolls, means for conveying said mandrel with the tube thereon through said reeling rolls, an abutment for the open end of said tube, and means for withdrawing the mandrel from the tube.

5. An apparatus for forming tubes from cup-shaped billets comprising a mandrel adapted to support a hollow closed end billet upon its end, a plurality of stationary dies, means for forcing said mandrel with the billet thereon through said dies to reduce the billet to a tube of desired finished size, means for withdrawing the last mentioned means, a plurality of reeling rolls, means for conveying said mandrel with the tube formed thereon through said reeling rolls, means adapted to engage the open end of said tube, and means for removing said mandrel from the tube and at the same time straightening said mandrel for further use.

6. As a step in the process of making metal tubes upon apparatus of the push-bench type; after the mandrel and the tube formed upon it have passed through the reducing means, conveying the mandrel, with the said tube upon it, through rolls which polish, or planish, it and loosen its hold upon the mandrel, while leaving the structure of the metal substantially unchanged, and, subsequently, causing the open end of said tube to engage an abutment to thereby permit removing the mandrel from the said tube.

7. As a step in the process of making metal tubes or other tubular articles upon apparatus of the push bench type in which cup-shaped billets are placed upon the forward end of a mandrel and are pushed through a series of orifices, so reducing the said billet in thickness and spreading it out longitudinally along the mandrel, conveying the mandrel with the billet or tube on it through rolls which polish or planish it and loosen its hold upon the mandrel while leaving the structure of the metal substantially unchanged, and subsequently with-drawing the mandrel from the said tube by means of rolls.

8. In the process of making metal tubes in apparatus of the push bench type after the mandrel and the tube formed upon it have passed through the reducing means, the step of conveying the mandrel with the said tube upon it through rolls which loosen its hold upon the mandrel while leaving the structure of the metal in the tube substantially unchanged, engaging a portion of the tube out of the path of the mandrel, and causing relative endwise movement between the mandrel and the tube for effecting removal of the mandrel from the tube.

9. In the process of making metal tubes upon apparatus of the push bench type after the mandrel and the tube formed upon it have passed through the reducing means, the step of conveying the mandrel with the said tube upon it through rolls which planish it and loosen its hold upon the mandrel while leaving the average wall thickness and the length of the tube blank substantially the same, and subsequently separately engaging the tube and the mandrel and causing relative movement of the engaging means to thereby effect removal of the mandrel from the tube.

10. In the process of making metal tubes or other tubular articles upon apparatus of the push bench type in which cup-shaped billets are placed upon the forward end of a mandrel, which mandrel is engaged at its rearward end by a pusher and is bodily pushed through a series of orifices, thereby reducing the billet in thickness and spreading it out longitudinally along the mandrel, the steps consisting in disconnecting the mandrel with the formed tube thereon from the pusher, advancing the mandrel until it is clear of the said orifices, conveying the mandrel with the tube on it through rolls which planish it and loosen its hold upon the mandrel while leaving the average wall thickness of the tube and the length thereof substantially unaffected, and subsequently withdrawing the mandrel from the tube.

In testimony whereof I have hereunto set my hand.

MATHIAS PETERS.